US010309223B2

United States Patent
Safari Zadeh et al.

(10) Patent No.: US 10,309,223 B2
(45) Date of Patent: Jun. 4, 2019

(54) ROTATIONAL IMBALANCE REDUCTION (71) Applicant: General Electric Company, Schenectady, NY (US)

(72) Inventors: Immanuel Safari Zadeh, Othmarsingen Aargau (CH); James Michael Fogarty, Schenectady, NY (US); Mateusz Wojciech Golebiowski, Rutihof Aargau (CH)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 15/266,553

(22) Filed: Sep. 15, 2016

(65) Prior Publication Data
US 2018/0073366 A1 Mar. 15, 2018

(51) Int. Cl.
*F01D 5/02* (2006.01)
*F01D 5/08* (2006.01)
(Continued)

(52) U.S. Cl.
CPC .............. *F01D 5/027* (2013.01); *F01D 5/08* (2013.01); *F01D 5/10* (2013.01); *F01D 5/26* (2013.01);
(Continued)

(58) Field of Classification Search
None
See application file for complete search history.

(56) References Cited

U.S. PATENT DOCUMENTS 3,499,136 A 3/1970 Nunnikhoven et al.
4,060,707 A * 11/1977 Olsson ..................... F01D 5/027
219/121.62
(Continued)

FOREIGN PATENT DOCUMENTS

DE 102011079740 A1 * 1/2013 .............. G01M 1/24
FR 2 303 277 A1 10/1976
WO WO 2007107762 A1 * 9/2007 ......... A61K 41/0052

OTHER PUBLICATIONS

"Innovative Induction Heating Turnkey Manufacturing Solutions," Induction Atmospheres, Retrieved From the Internet URL: http://www.gh-ia.com/induction_heating.html, on May 2, 2018, pp. 1-4 (2018).
(Continued)

*Primary Examiner* — Paul M. West
*Assistant Examiner* — Mark A Shabman
(74) *Attorney, Agent, or Firm* — Charlotte C. Wilson; Frank A. Landgraff (57) ABSTRACT

Various embodiments include apparatuses and systems for controlling rotational imbalance of a rotary element. In one embodiment, a rotational imbalance reduction apparatus includes at least one heating element for heating a location on a rotary element, a pulsing element configured to pulse actuate the heating element in synchronization with a multiple, fraction, or mixed fraction of the frequency of rotation of the rotary element, and a control system coupled with the pulsing element and the heating element, the control system actuating the heating element and the pulsing element to apply heat to the location of the rotary element in pulses synchronized with the multiple, fraction, or mixed fraction of the frequency of rotation of the rotary element.

11 Claims, 8 Drawing Sheets

(51) Int. Cl.
   *F01D 5/10*     (2006.01)
   *G01M 1/30*     (2006.01)
   *G01M 15/14*    (2006.01)
   *F01D 5/26*     (2006.01)
   *F01D 17/02*    (2006.01)
   *G01M 1/22*     (2006.01)
   *H05B 6/10*     (2006.01)

(52) U.S. Cl.
   CPC ............... *F01D 17/02* (2013.01); *G01M 1/22* (2013.01); *G01M 1/30* (2013.01); *G01M 15/14* (2013.01); *H05B 6/102* (2013.01)

(56) References Cited

U.S. PATENT DOCUMENTS

| | | |
|---|---|---|
| 4,445,398 A | 5/1984 | Kerlin |
| 4,644,123 A * | 2/1987 | Kerlin .................... B23H 9/00 219/130.4 |
| 4,977,510 A | 12/1990 | Winzenz et al. |

OTHER PUBLICATIONS

Extended European Search Report and Opinion issued in connection with corresponding EP Application No. 17188580.9 dated Mar. 6, 2018.
DISS. ETH No. 9327 Thermisches Wuchten eines Generatorlaufers mittels eingebauter Zurich 1991 (english abstract attached to article).
GER-4724 Buskirk Torsional Dynamics Large 2-pole and 4-pole Steam Turbine Powertrains (May 2013).

* cited by examiner

ROTATIONAL IMBALANCE REDUCTION

BACKGROUND OF THE INVENTION

The subject matter disclosed herein relates to rotary elements. More particularly, the subject matter disclosed herein relates to apparatuses and systems for reducing turbine rotational imbalance.

When disturbed from rest, all mechanical structures, such as turbomachine rotors, vibrate at particular frequencies. Rotational imbalances in the rotors exacerbate the vibrations, which can pose considerable problems when operating rotors, especially above certain rotational speeds. Excessive vibration can cause unnecessary fatigue, structural stress and strain, less efficient operation, or undesirable physical interference between moving parts, for example. Conventional balancing techniques attempt to adjust the weight of the rotor at a single speed, but these techniques cannot always compensate for rotor imbalances because often the imbalances arise or change while starting or operating the rotor. For example, asymmetric thermal heating of the rotor results in bending of the rotor shaft, which causes the rotor to be imbalanced around the rotational axis. In another example, the excitation coils of large turbo-generators sometimes shift along the rotor axis. If these shifts are not exactly symmetrical, mechanical stresses and strains are induced which also result in imbalances. Erosion of the compressor and turbine blades is a further mechanism that can unbalance a rotor of a large gas and steam turbine. These imbalances result from operation of the rotor, and hence, cannot be adequately addressed by conventional techniques.

BRIEF DESCRIPTION OF THE INVENTION

In one embodiment, a rotational imbalance reduction apparatus includes at least one heating element for heating a location on a rotary element, a pulsing element configured to pulse actuate the heating element in synchronization with any multiple, fraction, or mixed fraction of a frequency of rotation of the rotary element, and a control system coupled with the pulsing element and the heating element, the control system actuating the heating element and the pulsing element to apply heat to the location of the rotary element in pulses synchronized with the multiple, fraction, or mixed fraction of the frequency of rotation of the rotary element.

In another embodiment, a system includes a turbine system includes a rotary element, at least one heating element mounted proximate the rotary element, and a control system coupled with the heating element. The control system determines whether a rotational imbalance of the turbine system exceeds a predetermined level and actuates the heating element to heat the rotary element in response to determining that the rotational imbalance of the turbine system exceeds the predetermined level.

In another embodiment, a system includes at least one computing device configured to detect a rotational imbalance greater than a predetermined level in a turbomachine rotor assembly, and to actuate a heating element coupled with the rotary element in a pulsed manner to heat the rotary element in response to detecting the rotational imbalance greater than the predetermined level.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a steam turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Figure 1:
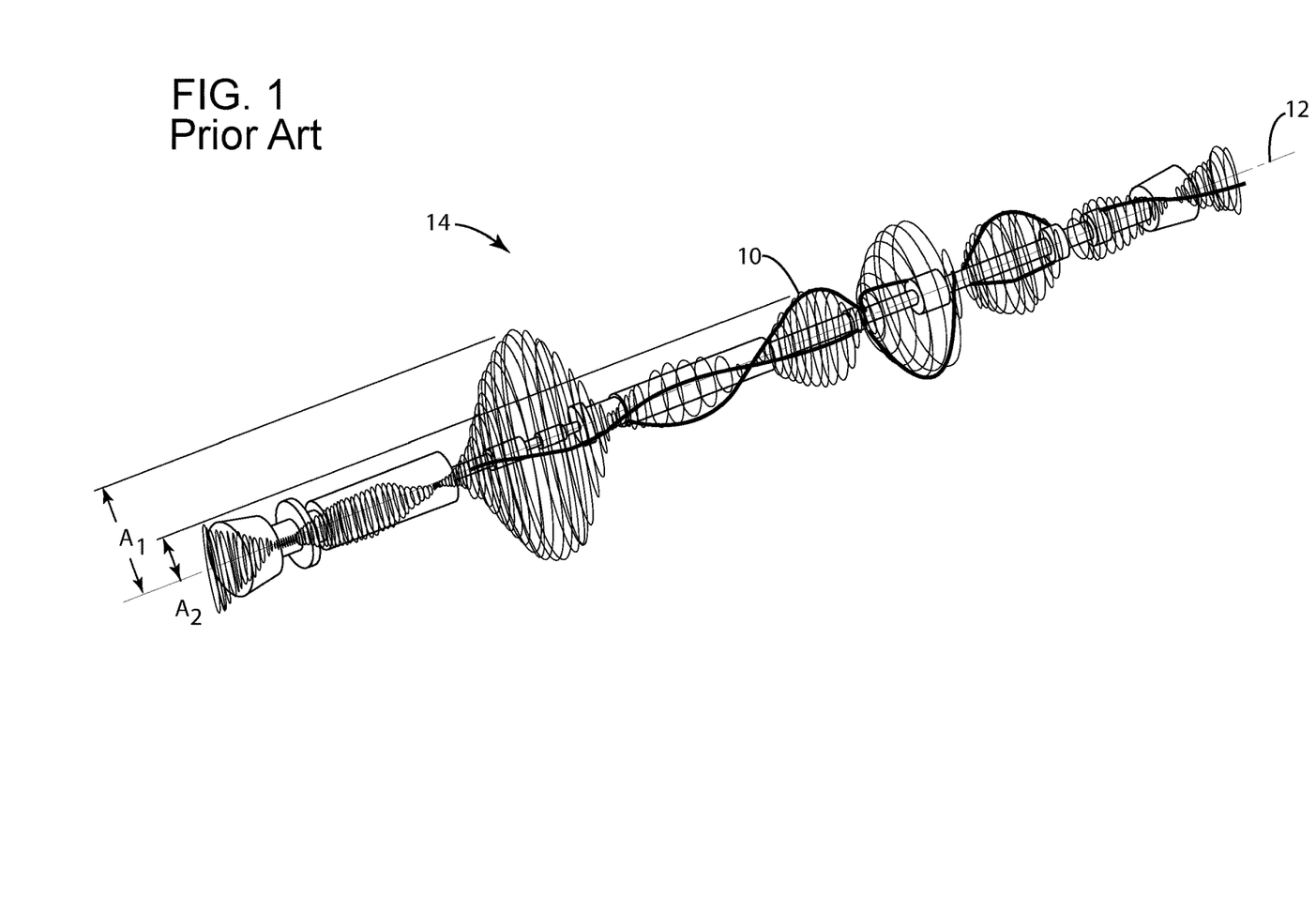
FIG. 1 is an isometric view of a turbomachine rotor assembly depicting vibration along a longitudinal axis of the turbomachine rotor assembly.

As indicated above, the subject matter disclosed herein relates to rotary elements. More particularly, the subject matter disclosed herein relates to apparatuses and systems for reducing rotational imbalance of rotary elements, e.g., turbomachine rotors or rotor assemblies. When disturbed from rest, all mechanical structures, such as turbomachine rotors, vibrate at particular frequencies. Rotational imbalances in the rotors exacerbate the vibrations, which can pose considerable problems when operating rotors, especially above certain rotational speeds. FIG. 1 is an isometric view depicting an example of rotor assembly vibration 10 along a longitudinal axis 12 of a rotor assembly 14. The rotor assembly vibration 10 includes oscillating motion radially, and a vibration amplitude varies across the longitudinal axis 12 of rotor assembly 14. For example, amplitudes A1 and A2 vary.

Various embodiments described herein include apparatuses, systems, and related computer program products, for reducing rotational imbalance of rotary elements. In the following description of these apparatuses, systems, and related computer program products, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 2:
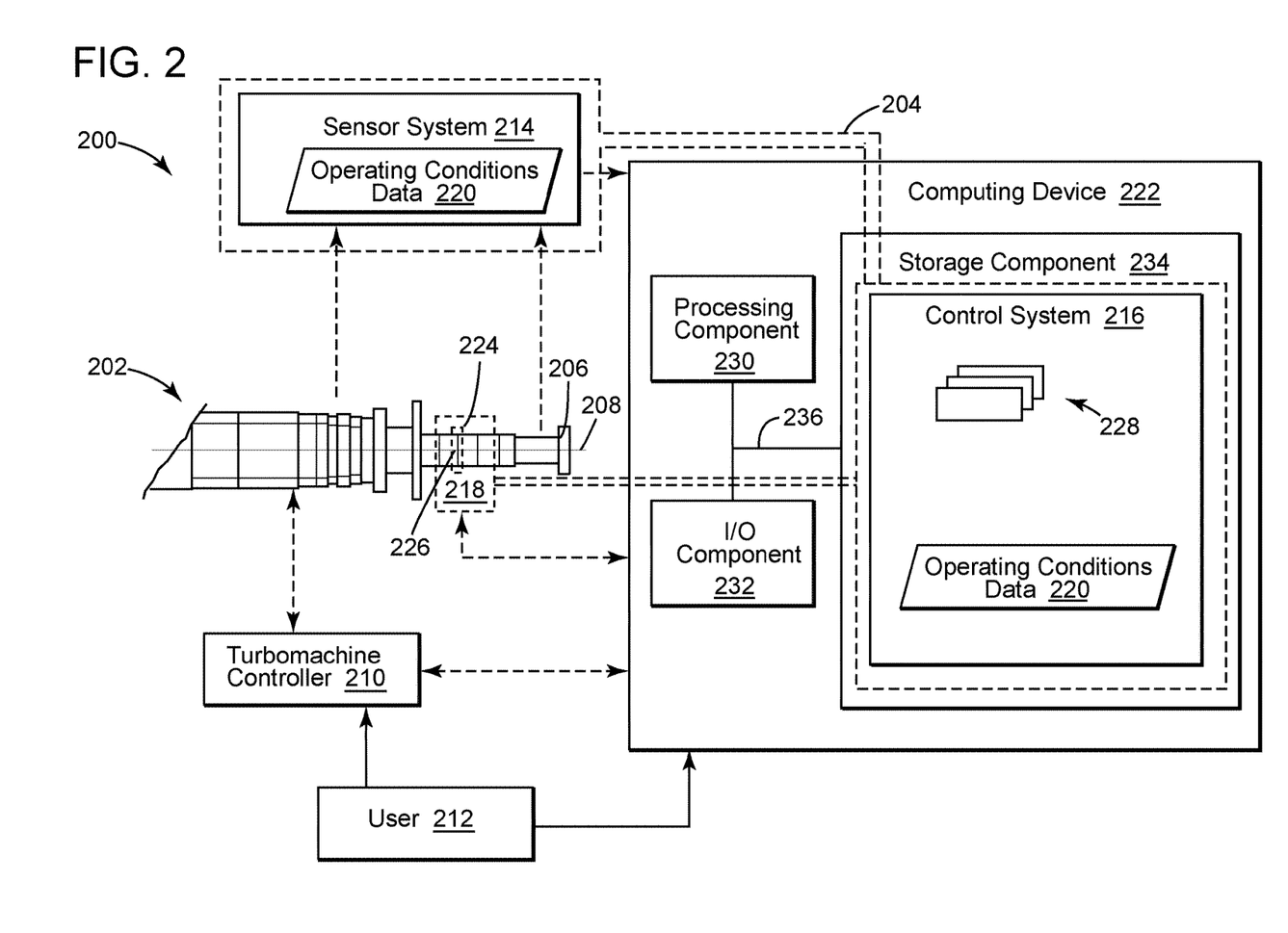
FIG. 2 is a schematic diagram illustrating a turbomachine system including a rotational imbalance reduction apparatus, according to various embodiments of the invention.

FIG. 2 is a schematic diagram illustrating a rotational imbalance reduction system 200, including a rotary element, which in the embodiment of FIG. 2 includes a turbomachine rotor assembly 202, and a rotational imbalance reduction apparatus 204, according to embodiments of the disclosure. Turbomachine rotor assembly 202 can include a rotor shaft 206, which rotates about a central axis 208. Turbomachine rotor assembly 202 and rotor shaft 206 are each rotary elements. The rotation of turbomachine rotor assembly 202 can be controlled by a turbomachine controller 210, which can accept input from a user 212.

Rotational imbalance reduction apparatus 204 includes a sensor system 214, a control system 216, and a heating apparatus 218. Sensor system 214 collects data regarding operating conditions (i.e., operating conditions data 220) of turbomachine rotor assembly 202 (e.g., rotational speed, rotation frequency, radial vibration amplitude, etc.), and makes operating conditions data 220 accessible to control system 216. Control system 216, which can be implemented, for example, with a computing device 222, and which can accept input from user 212, can use this operating conditions data 220 to determine rotational imbalance of turbomachine rotor assembly 202. Based at least in part on operating conditions data 220, control system 216, which is coupled with heating apparatus 218, can control heating apparatus 218. Heating apparatus 218 can include at least one heating element 224 positioned proximate a designated location 226 of rotor assembly 202, to couple with and heat designated location 226. Heating designated location 226 can promote a bending moment at designated location 226, to bend and rebalance turbomachine rotor assembly 202, or at least reduce imbalance. Control system 216 (including modules 228), computing device 222 (including a processing component 230, an I/O component 232, a storage component 234, and a communications pathway 236), and sensor system 214 is described more fully herein below. First, however, heating apparatus 218, including heating element 224, is described in greater detail.

Figure 3:
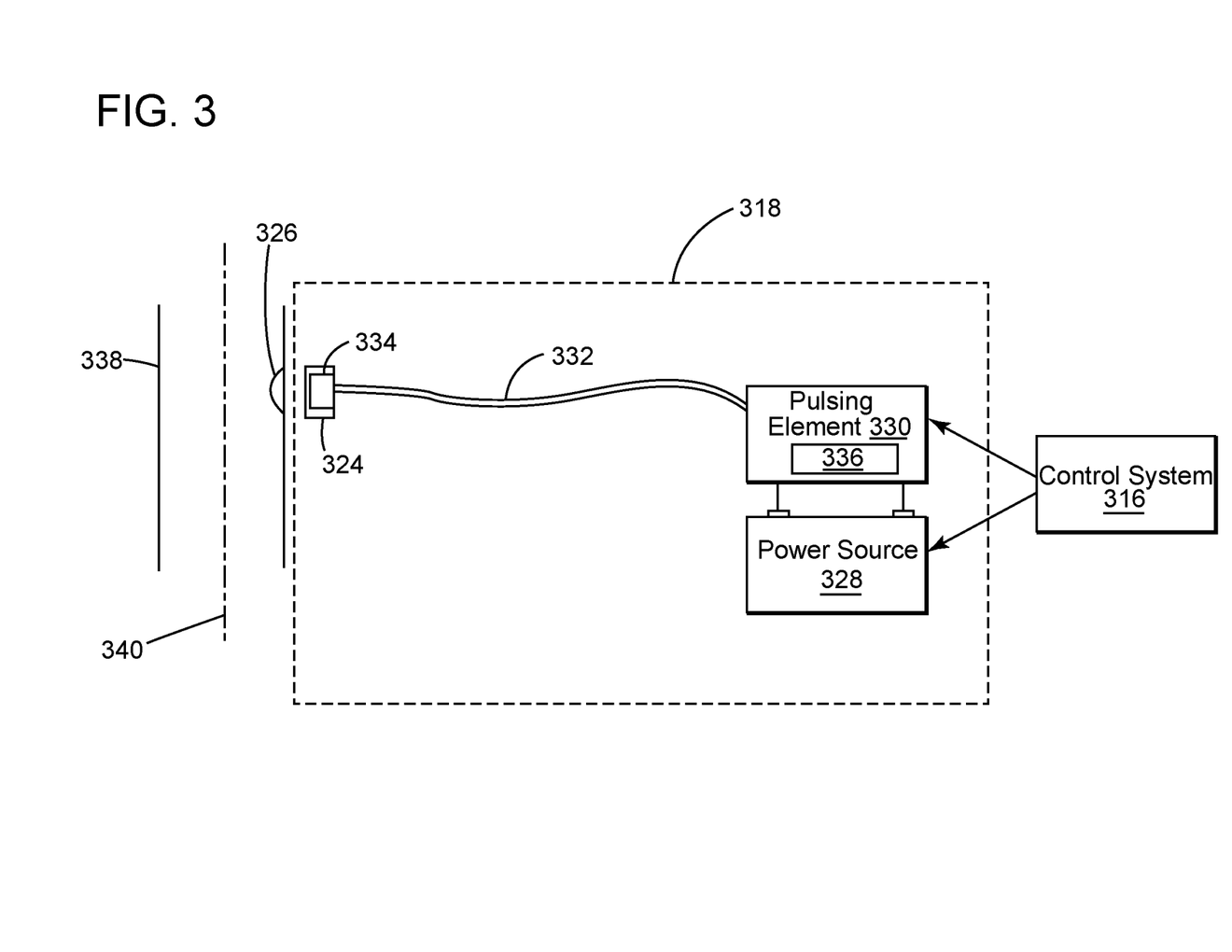
FIG. 3 is a schematic view illustrating one embodiment of a heating apparatus including a heating element, according to various embodiment of the invention.

Various embodiments of heating apparatus 218 and heating element 224 of rotational imbalance reduction apparatus 204 are conceived. FIG. 3 is a schematic view illustrating such an embodiment of a heating apparatus 318 including a heating element 324. In this embodiment, in addition to heating element 324, heating apparatus 318 includes a power source 328, a pulsing element 330, and a signal delivery conduit 332. A control system 316 can be coupled and/or in communication with power source 328 and/or pulsing element 330 to control heating apparatus 318, as described in greater detail herein below. Power source 328, pulsing element 330, signal delivery conduit 332, and heating element 324 are electrically coupled, or in electrical communication. Power source 328 can be any now-known or later-developed power supply. Power source 328 supplies electrical signal through signal delivery conduit 332 (e.g., electrically conductive wire) to heating element 324. Pulsing element 330 includes a high-frequency switching element 336 that switches the electrical signal supplied by power source 328 on and off to harmonically or repeatedly pulse the electrical signal supplied by power source 328 to heating element 324. The harmonically or repeatedly pulsed signal actuates heating element 324 in a harmonically or repeatedly pulsed manner. Heating element 324 includes an inductor 334, which can be any now-known or later-developed inductor, such as coiled electrically conductive wires 448 with one or more loops (see FIG. 4), in some cases surrounding a metal core 450 (see FIG. 4). Inductor 334 conducts the electrical signal during each pulse heating element 324 is actuated, and induces, in a harmonically or repeatedly pulsed manner, an eddy current in an adjacent, designated location 326 of a rotary element 338. The eddy current flowing through designated location 326 heats designated location 326, which expands the location and creates a bending moment to rebalance the weight of rotary element 338 around a center axis 340 and reduce rotational imbalance. Inductor 334 is spaced from designated location 326 a distance appropriate to effect electrical inducement as discussed above.

This embodiment using inductor 334 can be beneficial when rotary element 338 is an electrically conductive metal or another electrically conductive material in which eddy current can be induced. If designated location 326 of rotary element 338 is not sufficiently able to have eddy current induced, or if there is a desire to enhance induction, an electrically conductive dopant can be applied to designated location 326. The induced eddy current can heat the dopant, which can then conduct the heat to the designated location 326.

The harmonic or repeated pulse can be synchronized with any multiple, fraction, or mixed fraction (e.g., any positive number) of a frequency of rotation of rotary element 338, such that inductor 334 creates eddy current in one or more designated locations 326 any desired number of times per turn or per number of turns. For example, to heat a single designated location 326 once per turn, the pulses can have a frequency matching the rotation frequency of rotary element 338—one pulse per one turn. For multiple designated locations 326 to be heated in a single rotation of rotary element 338, inductor 334 can be actuated with multiple pulses during that rotation. For a single designated location 326 to be heated once every five rotations of rotary element 338, pulses can be repeated at a frequency ⅕ the rotation frequency of rotary element 338. For four designated locations 326 each to be heated once every five rotations, pulses can be repeated every 1.25 rotations of rotary element 338, which would mean a pulse frequency ⅘ of the rotation frequency. In this manner, harmonic or repeated pulses can be synchronized at any multiple, fraction, or mixed fraction (e.g., combination of a whole number and a fraction) of the rotation frequency of rotary element 338, to apply heat to one or more designated locations 326 at regular intervals.

Figure 4:
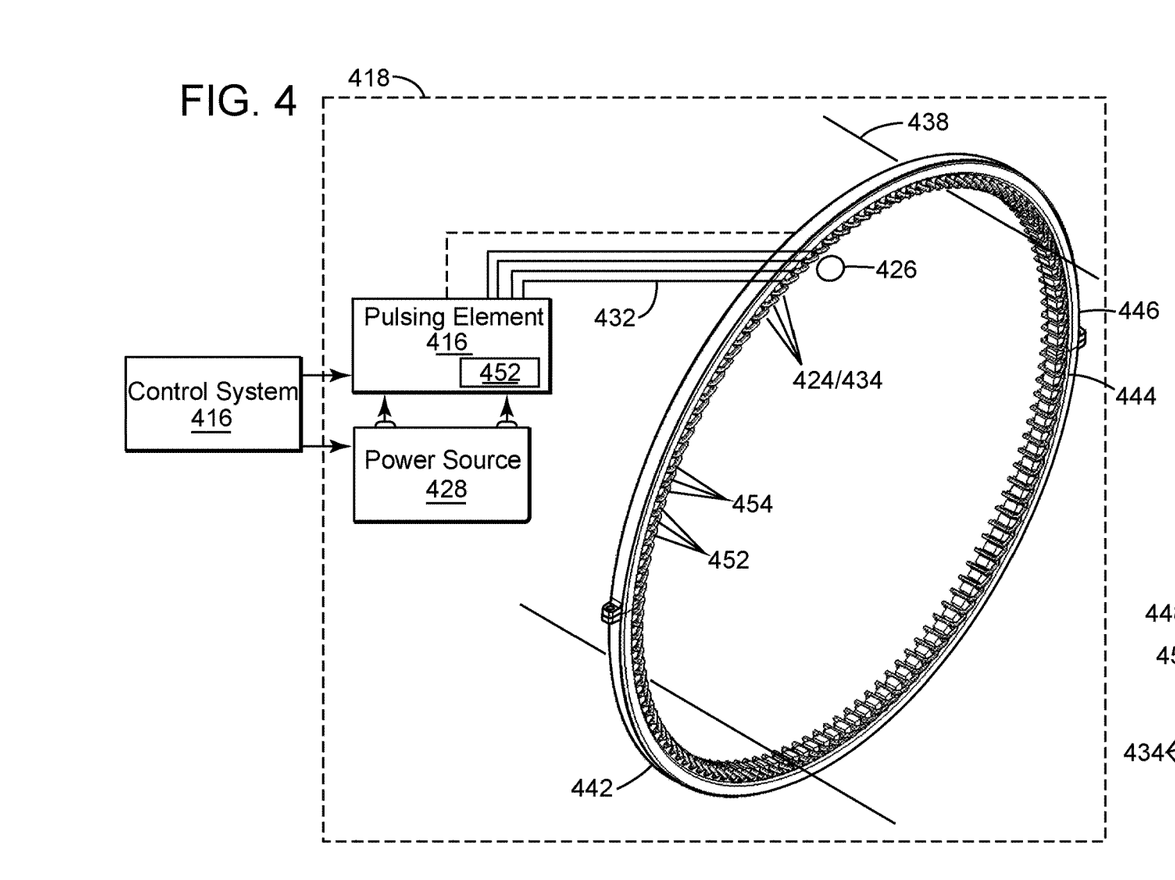
FIG. 4 is a partial schematic view, partial isometric view, illustrating an embodiment of a heating apparatus including an isometric view of a plurality of heating elements, each with an inductor, according to various embodiments of the invention.
Figure 5:
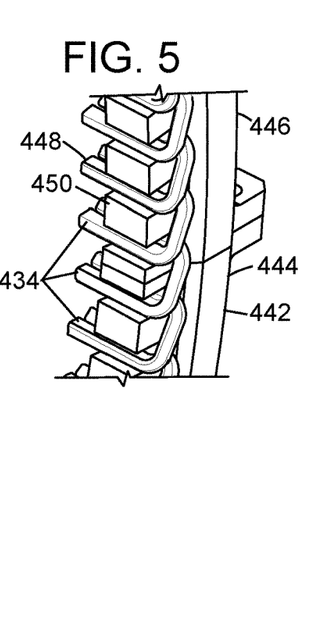
FIG. 5 is an enlarged isometric view of a portion of the plurality of heating elements of FIG. 4.

A single heating element 324 can be used as depicted in FIG. 3, or as depicted in FIG. 4, a plurality of heating elements 324 can be used. FIG. 4 is a partial schematic view, partial isometric view, illustrating an embodiment of a heating apparatus 418 including an isometric view of a plurality of heating elements 324, each with an inductor 334 (forming a plurality of inductors 334), according to various embodiments of the invention. Heating apparatus 418 also includes a power source 428, a pulsing element 430, and a plurality of signal delivery conduits 332. A control system 416 can be coupled and/or in communication with power source 428 and/or pulsing element 430 to control heating apparatus 418, as described in greater detail herein below. Power source 428 and pulsing element 430 are electrically coupled, or in electrical communication with the plurality of signal delivery conduits 432 and the plurality of heating elements 324. Power source 428 supplies electrical signal through signal delivery conduits 432 (e.g., electrically conductive wire) to heating element 324. Each heating element 324 is connected to a separate signal delivery conduit 432, however, for ease of illustration, only five signal delivery conduits 432 are shown. The significant differences of heating apparatus 418 from heating apparatus 318 (discussed with reference to FIG. 3) are driven by the greater number of heating elements 324 used in heating apparatus 418. Referring to FIG. 4, heating elements 324 and inductors 334 are arranged in the shape of a ring around a rotary element, in this case a rotor shaft 438. FIG. 5 is an enlarged isometric view of a portion of the plurality of heating elements 334 of FIG. 4. As discussed above, the plurality of heating elements 324 can include any now-known or later-developed inductor. In FIG. 4 and FIG. 5, inductors 334 are depicted as coiled electrically conductive wires 448 surrounding a metal core 450. Inductors 334 are mounted on a frame 442, which can be ring-shaped, or have segments 444, 446 that connect to be ring-shaped or partially ring-shaped, to surround or partially surround rotor shaft 438. Inductors 334 are positioned proximate rotor shaft 406, such that when actuated with a pulsed electrical signal, inductors 311 will induce eddy current in a designated location 426 of rotor shaft 438, as discussed above with respect to FIG. 3. As an example, inductors 334 can be positioned away from rotor shaft 438 on the order of millimeters in order to induce eddy current in rotor shaft 438.

Each separate heating element 324 is individually electrically connected or coupled to a respective signal delivery conduit 432, each of which can carry a pulsed electrical signal to a respective heating element 324. Heating elements 324 are each separately coupled with a separate signal delivery conduit 432 so that each heating element 324 can be actuated separately, and possibly at different times from the other heating elements 324. A multiplexer 452 or similar device can be used to coordinate signals transmitted from power source to each of the plurality of heating elements 324 through respective signal delivery conduits 432. Multiplexer 452 can be integrated with pulsing element 430 or electrically connected otherwise between power source 428 and signal delivery conduits 432, to facilitate determining which of the plurality of signal delivery conduits 432, at which time, carry signal to actuate respective heating elements 324. Depending on the desired size or shape of designated location 426, any desired number or pattern of heating elements 324 can be actuated simultaneously. In some cases, the plurality of heating elements 324 include a first subset 452 and a second subset 454 of heating elements 324, wherein control system 416 actuates first subset 452 in first pulses synchronized with the multiple, fraction, or mixed fraction of the frequency of rotation of the rotary element, and control system 416 actuates second subset 454 in second pulses synchronized with the multiple, fraction, or mixed fraction of the frequency of rotation of the rotary element. The first pulses are temporally offset from the second pulses. Adjacent groups or subsets of heating elements 324 can be actuated consecutively, such that designated location 426 is heated by each group or subset of heating elements 324 as rotor shaft 438 and designated location 426 rotate. In this manner, designated location 426 can be heated more continuously or at more intervals per rotation, relative to embodiments with only single heating elements.

Figure 6:
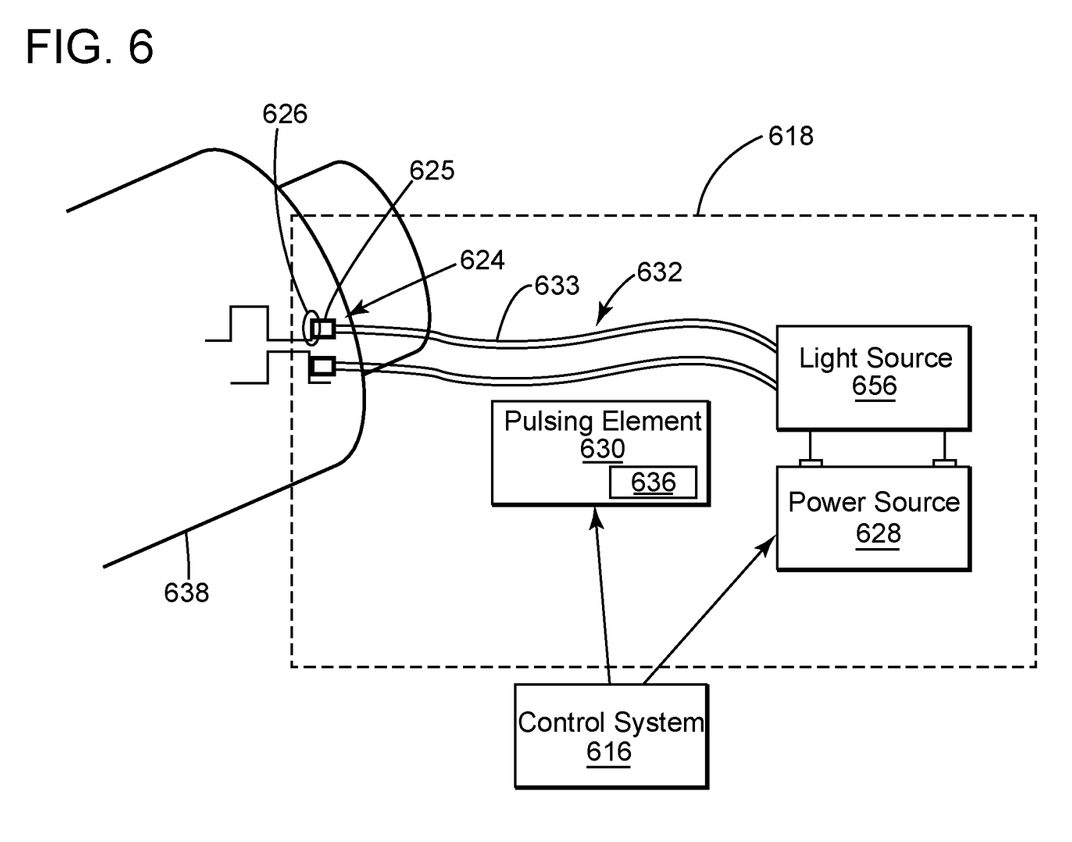
FIG. 6 is a schematic view illustrating one embodiment of a heating apparatus including a heating element, according to various embodiments of the invention.

FIG. 6 is a schematic view illustrating an embodiment of a heating apparatus 618 including a heating element 624, according to various embodiments of the invention. In this embodiment, in addition to heating element 624, power source 628, pulsing element 630, and signal delivery conduit 632, heating apparatus 618 includes a light source 656. A control system 616 can be coupled and/or in communication with power source 628 and/or pulsing element 630 to control heating apparatus 618, as described in greater detail herein below. Power source 628 is electrically coupled with light source 656 to supply electrical signal to light source 656. Light source 656 is optically coupled with signal delivery conduit 632, which can be positioned and configured to direct or transmit light onto a heating location 626 of a rotary element 638. Pulsing element 630 is electrically coupled with power source 628 and/or light source 656 (e.g. a switch 636 connected between light source 656 and power source 628), to pulse light signal output from light source 656, through signal delivery conduit 632, to heating element 624. As described above, the signal can be pulsed harmonically or repeatedly in synchronization with a frequency of rotation of heat location 626, to apply heat to heat location 626 once per designated number of rotations. Signal delivery conduit 632 includes an optical fiber 633 to carry or transmit the pulsed light signal to heating element 624.

Heating element 624 can include an optic 625, such as a lens, or an end of optical fiber 633, to shape or focus light onto heat location 626 in order to heat location 626. Light source 656 can be selected to emit a wavelength of light that will effectively heat location 626. For example, some materials might heat better under exposure to visible light, while others might heat more quickly under exposure to infrared light or ultraviolet light. Heating apparatus 618, which heats heat location 626 using light, can be used with rotary elements that have materials that heat under exposure to incident light, including some materials that are not electrically conductive (e.g. carbon fiber, nonconductive metals, hard plastics, etc.). Accordingly, heating apparatus 618 can effectively be used in cases heating apparatus 318 is not effective. Further, heat location 626 can be doped with a material that heats more responsively under exposure to any desired light. For other materials that do not sufficiently heat under any particular light, or to improve the heating, heat location 626 can be doped with a material that heats more reactively to any desired light exposure.

As with the embodiments described with reference to FIGS. 3-5, a single heating element 610 can be used, or a plurality of heating elements 624 can be used. When a plurality of heating elements 624 are used, heating elements 624 can be arranged in a ring, or a part of a ring, around rotary element 638, as described with reference to FIGS. 4 and 5. Each additional heating element 624 corresponds with an additional signal delivery conduit 632, and an additional switch 636, or a multiplexer 452 (see FIG. 4) to open and close each signal delivery conduit with the appropriate timing, as discussed with reference to FIGS. 4 and 5. The plurality of heating elements 624 can be actuated in harmonic or repeated pulses, as described with reference to FIGS. 4 and 5, to achieve the same effect of heating the heat location 626 from consecutive heating elements 624 as heat location 626 rotates.

Figure 7:
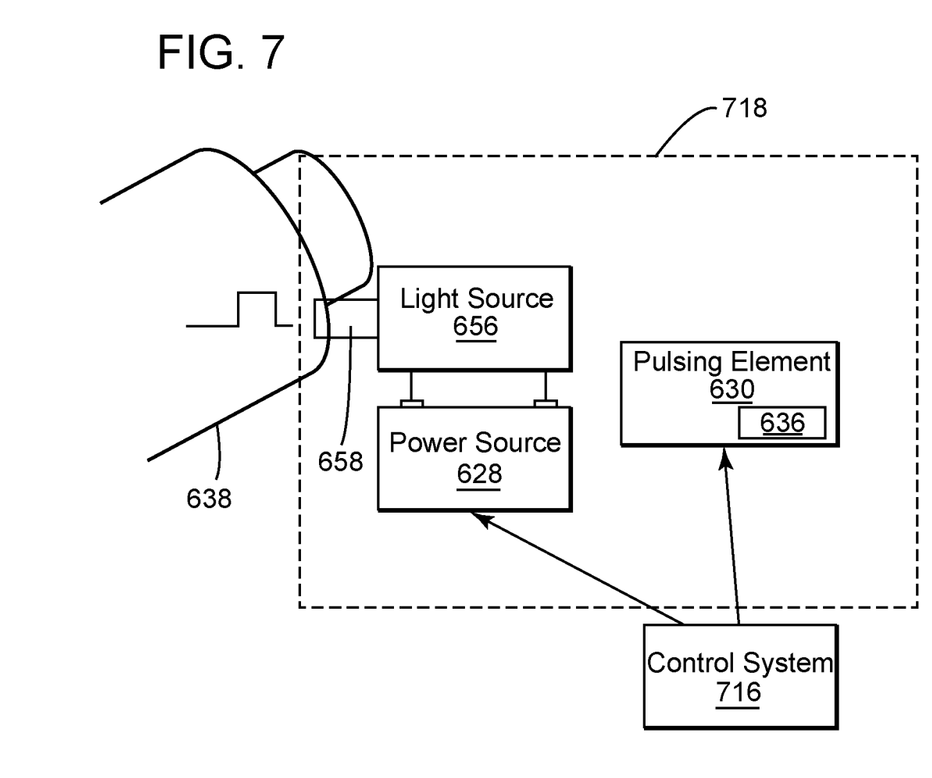
FIG. 7 is a schematic view illustrating an alternative embodiment of the heating apparatus of FIG. 6.

FIG. 7 is a schematic view illustrating an alternative embodiment of the heating apparatus of FIG. 6. In this alternative embodiment depicted in FIG. 7, light source 656 is positioned more closely to heat location 626 of rotary element 638 to direct light directly onto heat location 626 of rotary element 638. In this embodiment, signal delivery conduit 632 can be internal to light source 624, or signal delivery conduit 632 might be unnecessary. Similarly, light source 656 can function as heating element 624, emitting light directly onto rotary element 638. Otherwise, an additional lens or other optic 658 can function as heating element 624.

Figure 8:
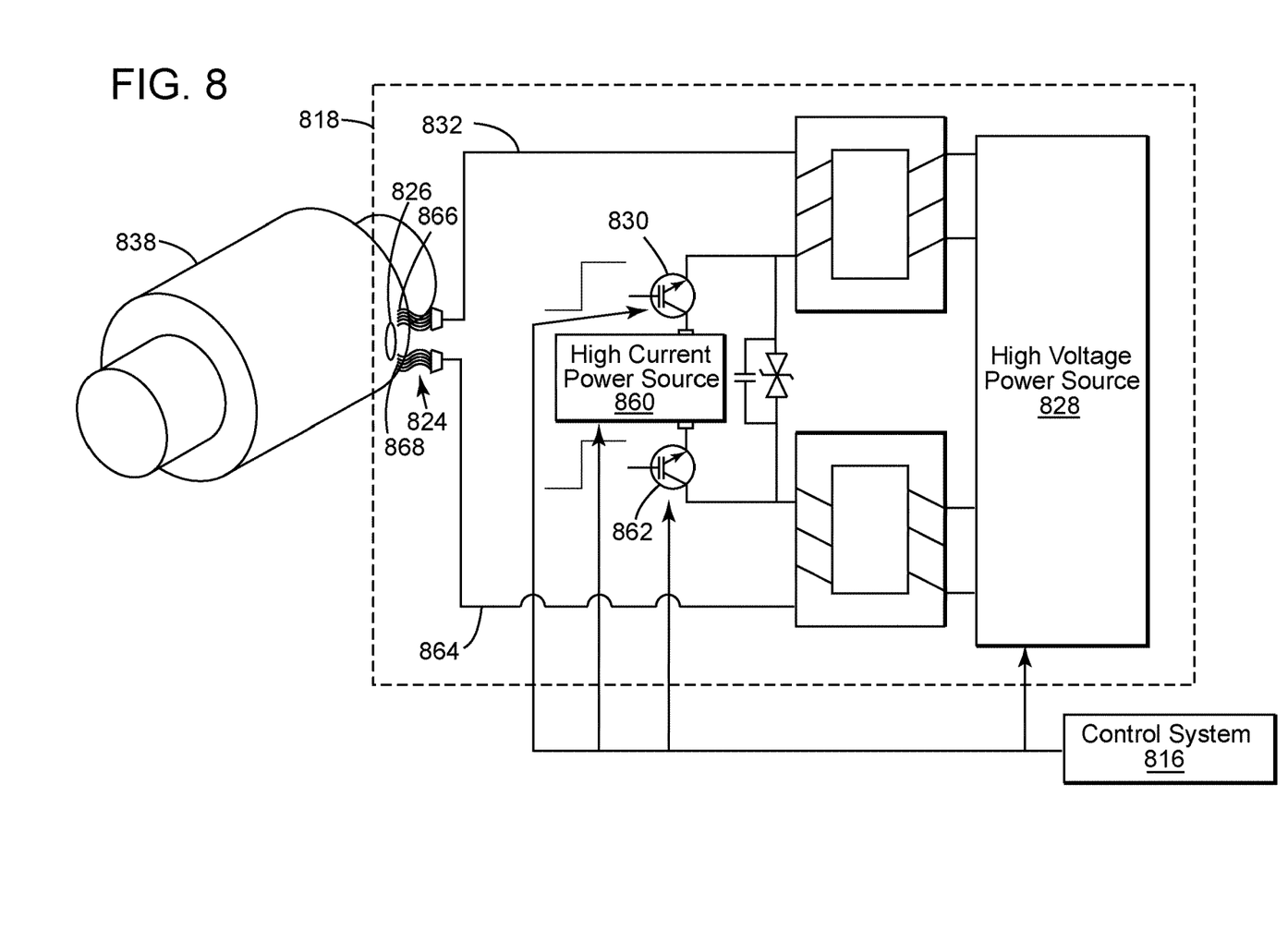
FIG. 8 is a schematic view illustrating an embodiment of a heating apparatus including a heating element, according to various embodiments of the invention.

FIG. 8 is a schematic view illustrating an embodiment of a heating apparatus 816 including a heating element 824, according to various embodiments of the invention. In this embodiment, in addition to heating element 824, heating apparatus 818 includes a first power source 828, a second power source 860, a first pulsing element 816, a second pulsing element 862, a first signal delivery conduit 832, and a second signal delivery conduit 864. A control system 816 can be coupled and/or in communication with first power source 828, second power source 860, first pulsing element 830, and second pulsing element 862, to control heating apparatus 818, as described in greater detail herein below. Signal delivery conduits 832 and 864 include electrically conductive wire to carry electrical signal from first power source 828 and second power source 860 to heating element 824. Heating element 824 includes a first electrode 862 and a second electrode 864, each located a distance from a rotary element to facilitate an electrical arc across the distance (i.e., gap) between each electrode 866, 868 and rotary element 838. A single heating element 810 can be used, or as similar to the embodiment discussed with reference to FIG. 4, a plurality of heating elements 810 can be used.

First power source 828 is electrically coupled to first signal delivery conduit 832 and first electrode 866. First power source 828 is also electrically coupled to second signal delivery conduit 832 and second electrode 868. First power source 828 supplies electrical signal to first electrode 866 through first signal delivery conduit 866 and to second electrode 868 through second signal delivery conduit 868. The electrical signals supplied by first power source 828 to electrodes 866, 868 are a constant electrical signal at a high voltage relative to electrical signal output by second power source 860. The constant signal yields a constant conducting path by non-interrupted ionizing air in the gap between each electrode 866, 868 and rotary element 838. In other words, a low-power electrical arc is generated between first electrode 866 and rotary element 838, and between second electrode 868 and rotary element, such that rotary element 838 closes the circuit where there is a gap between first electrode 866 and second electrode 868.

Second power source 860 is electrically coupled with first pulsing element 830, first signal delivery conduit 832, and first electrode 866. Second power source 860 is also electrically coupled with second pulsing element 830, second signal delivery conduit 864, and second electrode 868. Second power source 860 supplies electrical signal to first electrode 866 through first signal delivery conduit 866 and to second electrode 868 through second signal delivery conduit 868. First pulsing element 830 is arranged between second power source 860 and first and second electrodes 866, 868. Pulsing element 830 includes a switching element 831 that switches the electrical signal from second power source 860 on and off to pulse the electrical signal to first electrode 866. Second pulsing element 862 includes a switching element 863 that switches the electrical signal from second power source 860 on and off to pulse the electrical signal to second electrode 868. The electrical signal transmitted from second power source 860 has a high current and a low voltage relative to electrical signal transmitted from first power source 828. The high current, low voltage electrical signal conducts across the same arc path created by the high voltage electrical signal to create the desired heat on rotary element 838.

This embodiment using electrodes 866, 868 can be beneficial when rotary element 838 is made of an electrically conductive metal or another electrically conductive material that can act as an electrical bridge between first electrode 866 and second electrode 868, and be heated as a result. If designated location 826 of rotary element 838 is not sufficiently able to act as this electrical bridge and be heated as a result, or if it is desired to enhance the electrical conductivity of designated location 826, an appropriate electrically conductive dopant can be applied to designated location 826. The dopant can be heated, which can then conduct the heat to the designated location 826.

As discussed above, a single heating element 824 can be used, or as described with reference to FIGS. 4 and 5, a plurality of heating elements 824 can be used. Each heating element 824 would be matched with a first and second signal delivery conduit 832, 864, and first and second pulsing elements 830, 862 would each include a multiplexer (as seen in FIG. 4) or other similar signal path management device. When a plurality of heating elements 824 are used, heating elements 824 can be arranged in a ring, or a part of a ring, around rotary element 838. The plurality of heating elements 824 can be actuated in harmonic or repeated pulses, as described with reference to FIGS. 4 and 5, to achieve the same effect of heating location 826 of rotary element 838 with consecutively positioned heating elements 824 as heating location 826 rotates to pass each consecutive heating element 824.

Figure 9:
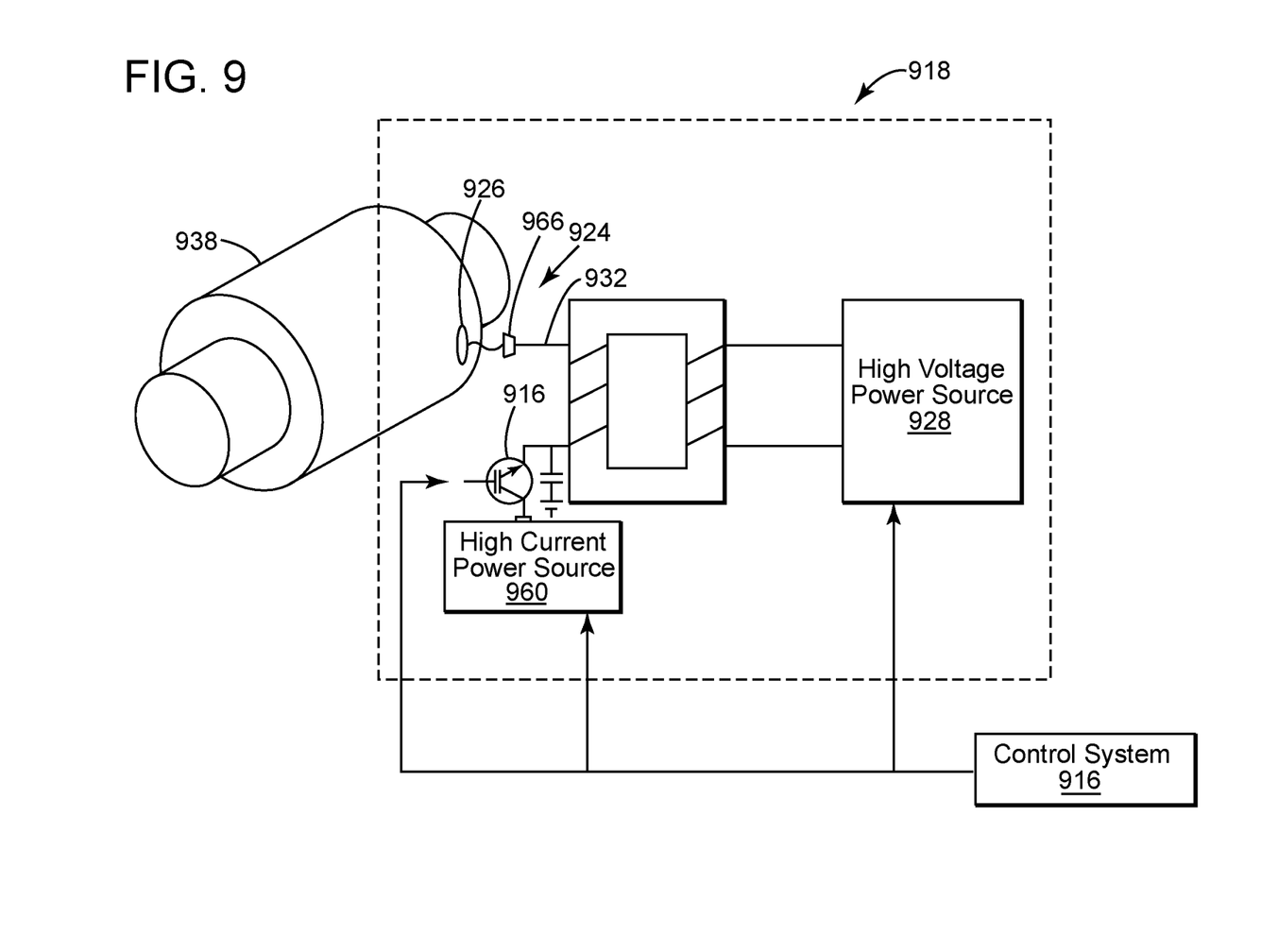
FIG. 9 is a schematic view illustrating an alternative embodiment of the apparatus of FIG. 8.

FIG. 9 is a schematic view illustrating an alternative embodiment of the heating apparatus 918 of FIG. 8, wherein a heating element 924 includes only one electrode 966. In this embodiment, in addition to heating element 924, heating apparatus 918 includes a first (high frequency, high voltage) power source 928, a second (high current, low voltage) power source 960, a pulsing element 930, and a signal delivery conduit 932. A control system 916 can be coupled and/or in communication with first power source 928, second power source 960, first pulsing element 930, and second pulsing element 962, to control heating apparatus 918, as described in greater detail herein below. Signal delivery conduit 932 includes electrically conductive wire. Electrode 966 is located a distance from a rotary element 938 to facilitate an electrical arc across the distance (i.e., gap) between electrode 966 and rotary element 938. A single heating element 924 can be used, or in a fashion similar to the embodiment discussed with reference to FIG. 4, a plurality of heating elements 924 can be used and arranged in a ring or a portion of a ring around rotary element 938.

First power source 928 is electrically coupled to signal delivery conduit 932 and electrode 966. First power source 928 supplies constant electrical signal at a high voltage relative to electrical signal output by second power source 960. First power source 928 supplies constant electrical signal through signal delivery conduit 932 to electrode 966. The constant signal yields a constant conducting path by non-interrupted ionizing air in the gap between electrode 966 and rotary element 938. In other words, a low-power electrical arc is generated between electrode 966 and rotary element 938.

Second power source 960 is electrically coupled with pulsing element 930, signal delivery conduit 932, and electrode 966. Pulsing element 930 includes a switching element 931 that switches the electrical signal from Second power source 960 on and off to pulse the electrical signal. The electrical signal transmitted from second power source 960 has a high current and a low voltage relative to electrical signal transmitted from first power source 928. The high current, low voltage electrical signal conducts across the same arc path created by the high voltage electrical signal to create the desired heat on rotary element 938.

As discussed above, a single heating element 924 can be used, or as described with reference to FIGS. 4 and 5, a plurality of heating elements 924 can be used. Each heating element 924 would be matched with a first signal delivery conduit 932 and a second signal delivery conduit 964, and pulsing element 930 would include a multiplexer (as seen in FIG. 4) or other similar signal path management device. When a plurality of heating elements 924 are used, heating elements 924 can be arranged in a ring, or a part of a ring, around rotary element 938. The plurality of heating elements 924 can be actuated in harmonic or repeated pulses, as described with reference to FIGS. 4 and 5, to achieve the same effect of heating location 926 of rotary element 938 with consecutively positioned heating elements 924 as location 926 rotates to pass each consecutive heating element 924.

Referring again to FIG. 2, rotational imbalance reduction apparatus 204 can further include a control system 216 coupled with heating element 224. As described herein, control system 216 can be configured, e.g., programmed, to perform particular functions. In various embodiments, the control system 216 is configured to:

A) determine a rotational imbalance profile, or detect a rotational imbalance greater than a predetermined level in a rotary element; and B) actuate heating element 224 in a pulsed manner to heat a region of rotary element in response to determining an undesirable rotational imbalance profile, or to detecting a rotational imbalance greater than the predetermined level.

It is understood that according to various embodiments, control system 216 can include hardware and/or software that is integrated with the turbomachine controller 210 (e.g., embedded as part of the programming language in turbomachine controller 210, or sharing common hardware with turbomachine controller 210

Control system 216 can detect vibration and/or rotation imbalance conditions (operating conditions data 220) of the turbomachine rotor assembly 202 that are determined to exceed an acceptable level or a predetermined threshold. This operating conditions data 220 may be obtained by control system 216 from one or more sensors (sensor system) 214 coupled to turbomachine rotor assembly 202, data logs stored in control system 216, and/or turbomachine controller 210, etc.

As described herein, in response to determining the rotational imbalance profile is undesirable, or to detecting a rotational imbalance greater than the predetermined level, control system 216 actuates heating element 224. In the embodiment of FIG. 3 for example, power source 328 and pulsing element 330 can be actuated to harmonically or repeatedly pulsate an electrical signal to heating element 324. The electrical signal supplied by power source 328 is switched on and off to heating element 324 by pulsing element 330. Heating element, including inductor 311, when activated, induces eddy current at adjacent designated location 326 on rotary element 338, heating location 326. The signal is pulsated at a frequency synchronized with a multiple, fraction, or mixed fraction of the rotation frequency of rotary element 338. Synchronizing the frequency in this manner facilitates heating of the same location 326 or locations 326 on rotary element 338 a designated number of times per designated number of rotations, while heating element 324 remains stationary. Effective results can be achieved by heating the predetermined location of the rotary element by only a few degrees. One degree Celsius can be sufficient, for example, in some cases. Ten degrees Celsius is effective in other cases. 20, 30, 40, or 50 or more degrees Celsius is effective in other cases.

Applying heat to a location of a rotary element can mitigate an unbalancing bend caused by differential thermal expansion between any two areas or parts of the turbomachine rotor assembly 202, or any other rotational imbalance that arises during operation. That is, when an undesirable rotational imbalance is detected, the location 226 can expand due to heating of the location 226, causing a bending moment that offsets the discovered bend, which reduces the rotational imbalance and resulting radial vibration amplitude. Control system 216 can read operating conditions data 220 dynamically, adjusting heat as necessary to reduce rotational imbalance as it increases or shifts during operation of rotary element 338.

Control system 216 can also control the duration of each pulse. The duration and strength of the pulses can vary depending on which type of heating element is used, what the vibrational profile of the rotary element looks like, etc., what the designated location to be heated looks like, how fast the rotary element spins, how hot the designated location is designated to be heated, etc.

The embodiments described with reference to FIGS. 6-9 are actuated similarly by control system 216. In each case, the power source and pulsing element can be actuated to harmonically or repeatedly pulsate a signal to the heating element at a frequency synchronized with a frequency of the rotary element. In the case of FIG. 6 and FIG. 7, the resulting signals pulsed are electromagnetic waves, or light. The control system actuates power source 628, 728, which powers light source 656, 756, and control system 616, 716 actuates pulsing element 630, 730 to either pulse power to light source 624, 724 or pulse light from light source 624, 724 more directly. In the case of FIG. 8, control system 816 actuates first power source (high frequency, high voltage power source) 828 to provide continuous electrical signal to first electrode 866 and second electrode 868. Control system 216 actuates high current, low voltage power source 860 to provide high current electrical signal to first and second electrodes 866, 868. Control system 216 actuates first and second pulsing elements 830, 862 to pulse these high current signals at a frequency matching a multiple, fraction, or mixed fraction of the rotation frequency of the rotary element. These signals create an electrical arc that heats the designated location of the rotary element at the desired frequency. In each embodiment, control system 216 can adjust the frequency of the pulses to synchronize with a multiple, fraction, or mixed fraction of the rotational frequency of the rotary element as the rotary element changes rotational speeds.

With each type of heating element, a plurality of heating elements can be used, arranged as depicted in FIGS. 5 and 6, in a ring or semi-ring around the rotary element. In these cases, a multiplexer 452 (see FIG. 4) or similar device can be used to coordinate communication with each of the plurality of heating elements. In these cases, control system 216 actuates the power source(s), the pulsing element(s), and if necessary, the multiplexer, to actuate at least a first subset of the plurality of heating elements in first pulses synchronized with the multiple, fraction, or mixed fraction of the frequency of rotation of the rotary element, and at least a second subset of the plurality of heating elements in second pulses synchronized with the multiple, fraction, or mixed fraction of the frequency of rotation of the rotary element, wherein the first pulses are temporally offset from the second pulses. The subsets of heating elements can be as few as one, or as many as there are heating elements in the plurality of heating elements. In the latter case, for example, the location on the rotary element to be heated can essentially be followed with heat as the rotary element rotates, with each heating element successively located in the ring successively pulsing, each at a frequency matching the multiple, fraction, or mixed fraction of the rotation frequency of the rotary element. This arrangement of the heating elements in a ring provides greater control over the heating of the designated location on the rotary element, and enables heat to be more continuously applied.

As indicated above, each heating apparatus 318, 418, 618, 818, and 918 can be used where heating apparatus 218 is shown in FIG. 2. Still referring to FIG. 2, to address vibration in a rotary element, depending on the particular rotary element and its vibration, more than one heating apparatus 218 can be used with a single control system 216. The various embodiments of heating element 318, 418, 618, 818, and 918, amongst others, can be used in any combination at various locations across a longitude of a rotary element, for example, to address different sections of the rotary element that vibrate variously, as seen in FIG. 1. The various embodiments of rotation imbalance reduction apparatus 324, 424, 624, 824, and 924, amongst others, can also be used (each with its own control system) in any combination at various locations across a longitude of a rotary element, for example, to address different sections of the rotary element that vibrate variously, as seen in FIG. 1.

As described herein, control system 216 can include any conventional control system components used in controlling a rotary element such as a turbomachine rotor assembly. For example, control system 216 can include electrical and/or electro-mechanical components for actuating one or more components in the turbomachine rotor assembly 202. The control system 216 can include conventional computerized sub-components such as a processor, memory, input/output, bus, etc. The control system 216 can be configured (e.g., programmed) to perform functions based upon operating conditions from an external source (e.g., at least one computing device 222), and/or may include pre-programmed (encoded) instructions based upon parameters of the turbomachine rotor assembly 202.

In various embodiments, the control system 216 is embodied, e.g., stored and/or operated in at least one computing device 222, which is connected with the turbomachine rotor assembly 202, including turbomachine controller 210, and heating element 224. In various embodiments, computing device 222 is operably connected with turbomachine rotor assembly 202, e.g., via sensor system 214, which can include a plurality of conventional sensors such as position sensors, temperature sensors, etc.

The computing device 222 is shown in communication with sensor system 214, which may store operating conditions data 220 about one or more components in turbomachine rotor assembly 202 to computing device 222. Further, computing device 222 is shown in communication with a user 212. A user 212 may be, for example, a programmer or operator. Interactions between these components and computing device are discussed elsewhere in this application.

One or more of the processes described herein can be performed, e.g., by at least one computing device, such as computing device 222, as described herein. In other cases, one or more of these processes can be performed according to a computer-implemented method. In still other embodiments, one or more of these processes can be performed by executing computer program code (e.g., control system 216) on at least one computing device (e.g., computing device 222), causing the at least one computing device to perform a process, e.g., reducing rotational imbalance of a turbomachine rotor assembly.

In further detail, computing device 222 is shown including a processing component 230 (e.g., one or more processors), a storage component 234 (e.g., a storage hierarchy), an input/output (I/O) component 232 (e.g., one or more I/O interfaces and/or devices), and a communications pathway 236. In one embodiment, processing component 230 executes program code, such as control system 216 (e.g., in particular embodiments when embodied as program code), which is, in these particular cases, at least partially embodied in storage component 234. While executing program code, processing component 230 can process data, which can result in reading and/or writing the data to/from storage component 234 and/or I/O component 232 for further processing. Pathway 236 provides a communications link between each of the components in computing device 222. I/O component 232 can comprise one or more human I/O devices or storage devices, which enable user 212, turbomachine controller 210 and/or control system 216 to interact with computing device 222 and/or one or more communications devices to enable user 212, turbomachine controller 210 and/or control system 216 to communicate with computing device 222 using any type of communications link. To this extent, control system 216 manage a set of interfaces (e.g., graphical user interface(s), application program interface, and/or the like) that enable human and/or system interaction with control system 216.

In any event, computing device 222 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, control system 216 can be embodied as any combination of system software and/or application software. In any event, the technical effect of computing device 222 is to reduce rotational imbalance in a rotary element, such as a turbomachine rotor assembly.

Further, control system 216 can be implemented using a set of modules 228. In this case, a module 228 can enable computing device 222 to perform a set of tasks used by control system 216, and can be separately developed and/or implemented apart from other portions of control system 216. Control system 216 may include modules 228 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computing device 222.

When computing device 222 comprises multiple computing devices, each computing device may have only a portion of control system 216 embodied thereon (e.g., one or more modules 228). However, it is understood that computing device 222 and control system 216 are only representative of various possible equivalent computer systems that may perform a process described herein. To this extent, in other embodiments, the functionality provided by computing device 222 and control system 216 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 222 includes multiple computing devices, the computing devices can communicate over any type of communications link. Further, while performing a process described herein, computing device 222 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, control system 216 enables computing device 222 to control rotational imbalance in a rotary element, e.g., a turbomachine rotor assembly. Control system 216 may include logic for performing one or more actions described herein. In one embodiment, control system 216 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, control system 216 and logic included therein will be described herein as a specific use machine. As will be understood from the description, while logic is illustrated as including each of the above-stated functions, not all of the functions are necessary according to the teachings of the invention as recited in the appended claims.

In any case, the technical effect of the various embodiments of the invention, including, e.g., the control system 216, is to control rotational imbalance in a rotary element, e.g., a turbomachine rotor assembly.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a turbomachine rotor assembly including a rotary element;
   at least one heating element mounted proximate the rotary element; and
   a control system coupled with the heating element, the control system:
     determining whether a rotational imbalance of the turbomachine rotor assembly exceeds a predetermined level; and
     actuating the at least one heating element to heat the rotary element in response to determining that the rotational imbalance of the turbomachine rotor assembly exceeds the predetermined level; and
   wherein the at least one heating element comprises a first electrode and a second electrode, the first electrode coupled to a first power source, the second electrode coupled to a second power source; and wherein the first power source is configured to supply high frequency, high voltage electricity relative to electricity supplied by the second power source, and the second power source is configured to supply high current, low voltage electricity relative to electricity supplied by the first power source.

2. The system of claim 1, wherein the rotary element comprises a dopant on a surface location, the dopant increasing a heat response in the surface location upon actuating the heating element, the increasing heat response being relative to a material composing the surface location undoped.

3. The system of claim 1, further comprising a sensor system including at least one sensor to detect vibration amplitude of the rotary element.

4. The system of claim 1, wherein the at least one heating element comprises a light transmitter configured to transmit light onto the rotary element.

5. The system of claim 1, wherein the at least one heating element comprises at least one electrode electrically configured to generate an arc of electricity from the at least one electrode to the rotary element.

6. The system of claim 1, wherein the at least one heating element comprises at least one inductor configured to induce an eddy current in the rotary element.

7. A system comprising:
a turbomachine rotor assembly including a rotary element;
at least one heating element mounted proximate the rotary element, the at least one heating element comprising a plurality of heating elements arranged to form at least a portion of a ring around the rotary element, the plurality of heating elements including a first subset and a second subset of heating elements;
a control system coupled with the heating element, the control system:

determining whether a rotational imbalance of the turbomachine rotor assembly exceeds a predetermined level; and
actuating the at least one heating element to heat the rotary element in response to determining that the rotational imbalance of the turbomachine rotor assembly exceeds the predetermined level; and
a pulsing element coupled to the control system and configured to pulse actuate the plurality of heating elements in synchronization with a multiple, fraction, or mixed fraction of a frequency of rotation of the rotary element;

wherein the control system activates the first subset of the plurality of heating elements in first pulses synchronized with the multiple, fraction, or mixed fraction of the frequency of rotation of the rotary element, and the control system activates the second subset of the plurality of heating elements in second pulses synchronized with the multiple, fraction, or mixed fraction of the frequency of rotation of the rotary element, the first pulses being temporally offset from the second pulses.

8. The system of claim 7, wherein the rotary element comprises a dopant on a surface location, the dopant increasing a heat response in the surface location upon actuating the heating element, the increasing heat response being relative to a material composing the surface location undoped.

9. The system of claim 7, further comprising a sensor system including at least one sensor to detect vibration amplitude of the rotary element.

10. The system of claim 7, wherein the at least one heating element comprises a light transmitter configured to transmit light onto the rotary element.

11. The system of claim 7, wherein the at least one heating element comprises at least one inductor configured to induce an eddy current in the rotary element.

* * * * *